(12) United States Patent
Schneider et al.

(10) Patent No.: US 9,425,717 B2
(45) Date of Patent: Aug. 23, 2016

(54) DEVICE AND METHOD FOR SUPPLYING AN ELECTRIC DRIVE WITH ELECTRIC CURRENT

(71) Applicant: Robert Bosch GmbH, Stuttgart (DE)

(72) Inventors: Thomas Schneider, Bad Koenigshofen (DE); Patrick Koenig, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 19 days.

(21) Appl. No.: 14/398,149

(22) PCT Filed: Apr. 17, 2013

(86) PCT No.: PCT/EP2013/057992
§ 371 (c)(1),
(2) Date: Oct. 31, 2014

(87) PCT Pub. No.: WO2013/164191
PCT Pub. Date: Nov. 7, 2013

(65) Prior Publication Data
US 2015/0084566 A1    Mar. 26, 2015

(30) Foreign Application Priority Data
May 3, 2012 (DE) .......... 10 2012 207 379

(51) Int. Cl.
*H02P 1/00*    (2006.01)
*H02P 4/00*    (2006.01)
*B60L 11/00*   (2006.01)
*B60L 11/18*   (2006.01)
*H02J 1/10*    (2006.01)

(52) U.S. Cl.
CPC ............... *H02P 4/00* (2013.01); *B60L 11/005* (2013.01); *B60L 11/1805* (2013.01); *B60L 11/1868* (2013.01); *B60L 11/1887* (2013.01); *H02J 1/102* (2013.01); *B60L 2210/10* (2013.01); *Y02T 10/7022* (2013.01); *Y02T 10/7066* (2013.01); *Y02T 10/7216* (2013.01); *Y02T 90/34* (2013.01)

(58) Field of Classification Search
CPC ... H02M 2003/1557; G06F 1/263; H02J 7/02; H02J 1/00
See application file for complete search history.

(56) References Cited

U.S. PATENT DOCUMENTS

| 7,464,433 B2 | 12/2008 | Thomar et al. |
| 2003/0211377 A1 | 11/2003 | Holmes et al. |
| 2013/0264870 A1* | 10/2013 | Keysar .................. H02J 1/00 307/24 |

FOREIGN PATENT DOCUMENTS

| CN | 101573860 | 11/2009 |
| CN | 102089963 | 6/2011 |
| CN | 104254458 | 12/2014 |
| DE | 102009052769 | 6/2011 |
| EP | 2117106 | 11/2009 |
| JP | 2011036101 | 2/2011 |

OTHER PUBLICATIONS

International Search Report for Application No. PCT/EP2013/057992 dated Feb. 26, 2014 (English Translation, 3 pages).

* cited by examiner

*Primary Examiner* — Karen Masih
(74) *Attorney, Agent, or Firm* — Michael Best & Friedrich LLP

(57) ABSTRACT

The present invention relates to a device (100) and a method for supplying an electric drive (101) with electric current. For this purpose, three DC/DC converters (102, 103, 104) are provided for coupling at least two connectable electric energy sources (105, 106) to the electric drive (101). The DC/DC converters (102, 103, 104) can be coupled in such a way that direct coupling of each individual one of the at least two electric energy sources (105, 106) to the electric drive (101) is formed via an individual one of the three DC/DC converters (102, 103, 104).

12 Claims, 3 Drawing Sheets

DEVICE AND METHOD FOR SUPPLYING AN ELECTRIC DRIVE WITH ELECTRIC CURRENT

BACKGROUND OF THE INVENTION

The present invention relates to a device for supplying electric current to an electric drive, to a drive train for a vehicle and to a method for supplying electric current to an electric drive.

In order to increase the range of electrically driven vehicles, it is known from the prior art to provide a plurality of, in particular different, energy sources. For mutual charge balancing of the energy sources, said energy sources are connectable to one another. Furthermore, the energy sources are also connected to the electric drive in order that current can be supplied to said electric drive. For this purpose, it is known from the prior art to connect DC-to-DC converters in series with the individual electrical energy sources in order that the respective output voltage of the individual energy sources can be adjusted to a presettable voltage level. For example, the Japanese laid-open specification JP 2011-36101 A1 discloses a design comprising three DC-to-DC converters. A first energy source, in this case a fuel cell, is in this case used simultaneously for supplying a high voltage to an electric drive and for supplying a relatively low voltage to further consumers in the electrical distribution system of the vehicle. For this purpose, two DC-to-DC converters are connected to this energy course, to which DC-to-DC converters in each case the desired output voltage is provided on the output side. In the example illustrated, a second energy source is connected directly to the electric drive. The electric drive is connectable directly to the consumers of the vehicle electrical distribution system via a third DC-to-DC converter. Therefore, the possibility is provided of supplying electrical energy to the vehicle electrical distribution system by means of the second energy source as well, or recuperatively by means of the electric drive. Variable adjustment of the output voltage of the second energy source in accordance with the requirement of the electric drive is not possible with this circuit since the second energy source is connected directly to the electric drive.

SUMMARY OF THE INVENTION

The present invention provides a device for supplying electric current to an electric drive. This device comprises three DC-to-DC converters for coupling at least two electrical energy sources to the electric drive. The three DC-to-DC converters are couplable in such a way that a direct coupling of each individual one of the at least two electrical energy sources to the electric drive via a single one of the three DC-to-DC converters is formed.

Therefore, an electrical circuit comprising three DC-to-DC converters is provided, wherein said DC-to-DC converters are arranged and couplable in such a way that a direct coupling of each individual one of the at least two electrical energy sources to the electric drive via a single one of the three DC-to-DC converters is possible. Advantageously, therefore, the output voltage of each individual one of the at least two electrical energy sources can be adjusted to a presettable electric voltage of the electric drive.

In one configuration of the invention, the three DC-to-DC converters are arranged and couplable in such a way that a direct coupling of the at least two electrical energy sources via one of the three DC-to-DC converters is formed.

Accordingly, a circuit is provided, which makes it possible to couple the three DC-to-DC converters in such a way that the two electrical energy sources are coupled directly via one of the three DC-to-DC converters. Advantageously, a possibility is thus provided of transferring electrical energy from one electrical energy source to the other. With this arrangement, the energy is transmitted only via a single DC-to-DC converter. Therefore, the conversion losses which occur during the energy transfer within the DC-to-DC converters are minimized.

In one configuration of the invention, the three DC-to-DC converters are couplable in such a way that a direct coupling of a single one of the at least two electrical energy sources to the electric drive via two DC-to-DC converters connected in parallel is formed.

A circuit is therefore provided in which the three DC-to-DC converters are arranged in such a way that one of the electrical energy sources is coupled to the electric drive by means of two DC-to-DC converters connected in parallel. Advantageously, it is thus made possible for the individual energy source to be able to transmit the electric power to be transmitted to the electric drive by means of two DC-to-DC converters. Depending on the configuration, a single DC-to-DC converter can permanently only transmit a limited electric power. Therefore, this arrangement makes it possible to transmit a much higher power to the electric drive than if only one DC-to-DC converter were available.

In one configuration of the invention, a third electrical energy source is provided. This electrical energy source is couplable to the device in such a way that a direct coupling of the third electrical energy source to one of the at least two electrical energy sources is formed.

A circuit is therefore provided in which three DC-to-DC converters are arranged in such a way that three energy sources are connectable, and the energy from said three energy sources can be transmitted to a connectable electric drive by means of the DC-to-DC converters, wherein, in this configuration, the third electrical energy source is connectable directly to one of the at least two electrical energy sources. Advantageously, therefore, a circuit is provided which enables direct energy exchange between two of the three energy sources. During this energy transfer, no losses therefore occur within a DC-to-DC converter.

In another configuration of the invention, it is provided that the electrical energy sources comprise a fuel cell and/or an electrical rechargeable battery and/or a capacitor.

Advantageously, a system is thus provided which enables a robust and lasting operation of the electric vehicle owing to the different natures of the energy sources, in relation to the chemical and physical parameters thereof.

In another configuration of the invention, it is provided that the three DC-to-DC converters have an identical design. An identical design is in this context understood in particular to mean that as many identical component parts or equivalent parts as possible are used for the individual DC-to-DC converters. In particular, the energy transmission power for which the DC-to-DC converters are designed is thus identical. Depending on the application case and the energy source connected, the DC-to-DC converters can be designed to be unidirectional or bidirectional. In particular in connection with rechargeable energy sources, it is possible to use bidirectional DC-to-DC converters.

Advantageously, minimized costs per item of the individual component parts for the DC-to-DC converters thus result.

In addition, the proposed circuits have a high degree of failsafety owing to a partially redundant functionality and use of the DC-to-DC converters. By virtue of the specific arrangements, reconnections and interconnections of the DC-to-DC converters described, advantages result for example in the case of frozen starting of a fuel cell, since a fuel cell requires a high current output at relatively low voltages for quick frozen starting. In the case of frozen starting, the voltage level at the rechargeable battery is generally lower than the voltage level of the electric drive. Since the DC-to-DC converters technically in practice only enable a certain transformation ratio, the fuel cell can be operated at a lower voltage level with the additional DC-to-DC converter between the fuel cell and the rechargeable battery, referred to below as "frozen starting converter", than using the DC-to-DC converter between the fuel cell and the drive. This enables safe and quick fuel cell starting in the frozen state. This DC-to-DC converter used for the frozen starting can also be used expediently during (normal) operation of the vehicle, or enables optimum utilization of a further energy store such as, for example, a supercapacitor.

The present invention furthermore provides a drive train for a vehicle which comprises at least two electrical energy sources, an electric drive and a device for supplying electric current to the electric drive. This device comprises three DC-to-DC converters for coupling at least two electrical energy sources to the electric drive. The three DC-to-DC converters are in this case couplable in such a way that a direct coupling of each individual one of the at least two electrical energy sources to the electric drive via an individual one of the three DC-to-DC converters is formed.

Thus, a drive train with an electrical circuit comprising three DC-to-DC converters is provided, wherein said DC-to-DC converters are arranged and are couplable in such a way that a direct coupling of each of the individual ones of the at least two electrical energy sources to the electric drive via a single one of the three DC-to-DC converters is enabled. Advantageously, the output voltage of each individual one of the at least two electrical energy sources of the drive train can therefore be adjusted to a presettable electric voltage of the electric drive.

Furthermore, the invention provides a method for supplying an electric current to an electric drive. In this method, three DC-to-DC converters for coupling at least two connectable electrical energy sources to the electric drive are provided. In accordance with the invention, the DC-to-DC converters in the method are coupled in such a way that each individual one of the at least two electrical energy sources is coupled directly to the electric drive via a single one of the three DC-to-DC converters.

Therefore, a method is provided in which three DC-to-DC converters are coupled in such a way that a direct coupling of each individual one of the at least two electrical energy sources to the electric drive via a single one of the three DC-to-DC converters is enabled. Advantageously, the adjustment of the output voltages of each individual one of the at least two electrical energy sources to a presettable electric voltage of the electric drive can be performed with this method.

In one configuration of the invention, the DC-to-DC converters are coupled in such a way that the at least two electrical energy sources are coupled directly via one of the DC-to-DC converters.

Accordingly, a method is provided which makes it possible to couple the three DC-to-DC converters in such a way that the two electrical energy sources are coupled directly via one of the three DC-to-DC converters. Advantageously, a method is thus provided for transferring the electrical energy from one of the electrical energy sources to the other. The energy is transmitted only via a single DC-to-DC converter in this method. Therefore, the conversion losses which occur during the energy transfer within the DC-to-DC converters are minimized.

In one configuration of the invention, it is provided that the DC-to-DC converters are coupled in such a way that a single one of the at least two electrical energy sources is coupled directly to the electric drive via two DC-to-DC-converters connected in parallel.

A method is thus provided in which the three DC-to-DC converters are coupled in such a way that one of the electrical energy sources is coupled to the electric drive by means of two DC-to-DC converters connected in parallel. Advantageously, a method is therefore provided which makes it possible to transmit the electric power to be transmitted from the individual energy source by means of two DC-to-DC converters to the electric drive. Depending on the configuration, a single DC-to-DC converter can permanently only transmit a limited electric power. Therefore, this method enables much higher levels of power transmission to the electric drive than if only one DC-to-DC converter were to be used.

In one configuration of the invention, a third electrical energy source is provided, which is coupled in such a way that the third electrical energy source is coupled directly to one of the at least two electrical energy sources.

Therefore, a method is provided which enables the connection of three energy sources to the three DC-to-DC converters in such a way that the energy of the three energy sources can be transmitted to a connectable electric drive, wherein the third electrical energy source is connectable directly to one of the at least two electrical energy sources. Advantageously, a method is thus provided which enables direct energy exchange between two of the three energy sources. In the case of this energy transfer, therefore, no losses occur within a DC-to-DC converter.

It goes without saying that the features, properties and advantages of the method according to the invention apply or are applicable correspondingly to the device according to the invention, and vice versa, or to the drive train.

BRIEF DESCRIPTION OF THE DRAWINGS

Further features and advantages of embodiments of the invention result from the description below with reference to the attached drawings.

DETAILED DESCRIPTION

Figure 1:
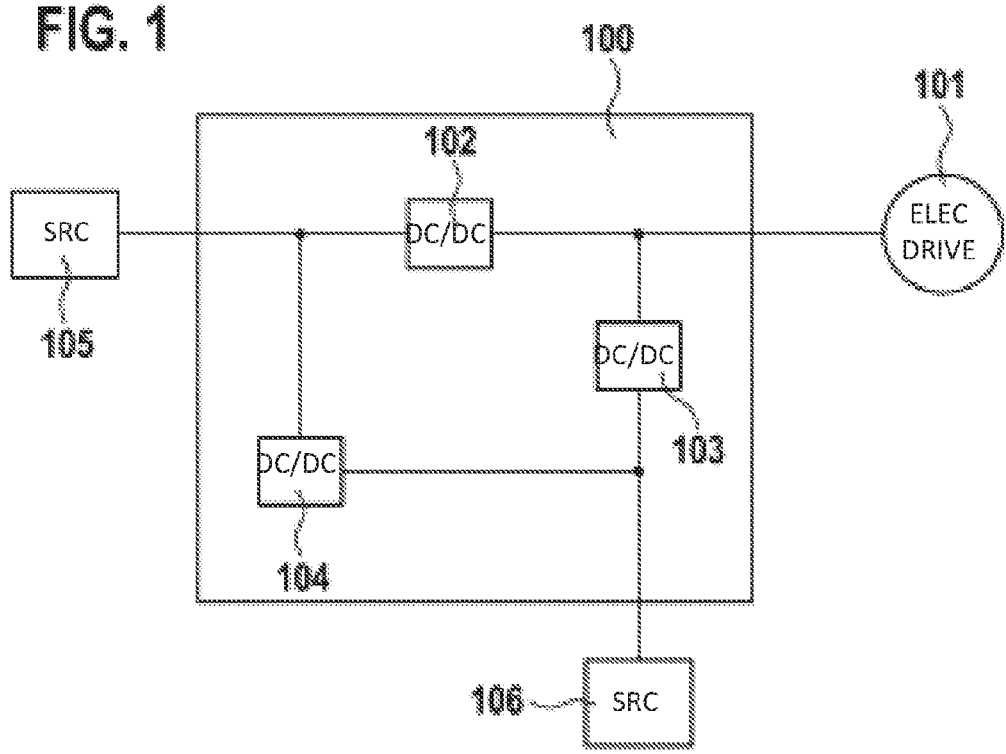
FIG. 1 shows, in schematic form, a device according to the invention for supplying electric current to an electric drive.

In the figures, identical and functionally identical elements, features and components, if not stated otherwise, are each provided with the same reference symbols. It goes without saying that components and elements in the drawings are not necessarily reproduced true to scale for reasons of clarity.

Further possible configurations and developments and implementations of the invention also include combinations which are not explicitly mentioned of features of the invention described above or below.

FIG. 1 shows, in schematic form, a device 100 according to the invention for supplying electric current to an electric drive 101. The two energy sources 105, 106 illustrated are connectable to the device. The device 100 comprises three DC-to-DC converters 102, 103 and 104. The DC-to-DC converters 102, 103 and 104 are arranged, electrically connected and connected to one another in such a way that efficient supply of energy from the energy sources 105, 106 to the electric drive 101 and efficient energy exchange between the energy sources 105 and 106 are made possible. In particular, the DC-to-DC converters 102, 103 and 104 are electrically connected to one another in the form of a ring. In particular, the energy sources 105, 106 and the electric drive 101 are each electrically connected between two of the three DC-to-DC converters 102, 103, 104. The energy from the first energy source 105 can be transmitted to the electric drive 101 via the first DC-to-DC converter 102, for example. The electric drive 101 in this case comprises, for example, an inverter for converting the DC voltage into an AC voltage, and an electric machine. If the electric machine is a DC machine, the inverter can be dispensed with. The energy from the second energy source 106 can be transmitted likewise to the electric drive 101 by means of the second DC-to-DC converter 103. The third DC-to-DC converter 104 is arranged in such a way that energy transfer from the first energy source 105 to the second energy source 106 is made possible via the third DC-to-DC converter 104. This arrangement is particularly advantageous if a fuel cell is used as first energy source 105 and the second energy source 106 is in the form of a rechargeable electric battery. In this exemplary embodiment, it is sufficient if the first and third DC-to-DC converters 102, 104 are unidirectional and the second DC-to-DC converter 103 is bidirectional since an energy flow in the direction of the fuel cell is not necessary. Charging of the rechargeable electric battery 106 during regenerative operation of the electric machine 101 is also made possible by means of the second bidirectional DC-to-DC converter 103.

Figure 2:
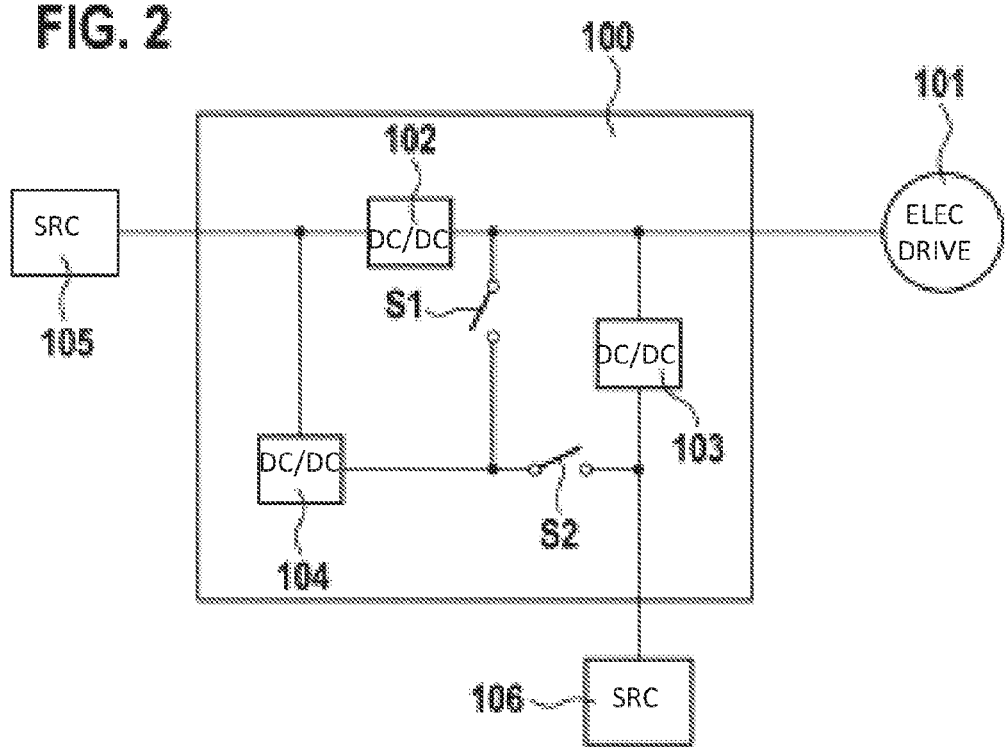
FIG. 2 shows, in schematic form, an exemplary embodiment of the device according to the invention for supplying electric current to an electric drive.

FIG. 2 shows, in schematic form, a further exemplary embodiment of the device 100 according to the invention for supplying electric current to the electric machine. In this exemplary embodiment, the device 100 comprises a further electrical connection, which enables parallel operation of the first and third DC-to-DC converters 102, 104 for supplying power to the electric drive 101 from the first electrical energy source 105. For this purpose, the further electrical connection forms a direct electrical connection between the electric drive 101 and the third DC-to-DC converter 104 on its side remote from the first electrical energy source 105. An additional first switching element S1 is provided on this line for opening or connecting this electrical line. During the parallel operation of the first and third DC-to-DC converters 102, 104 for supplying power to the electric drive 101 from the first electrical energy source 105, the switching element S1 is closed. Furthermore, a second switching element S2 is provided which is opened for the parallel operation. Said second switching element is arranged in such a way that the electrical connection of both the second DC-to-DC converter 103 and the second energy source 106 to the first switching element S1 and the third DC-to-DC converter 104 can be interrupted or closed. For the parallel operation of the DC-to-DC converters 102 and 104, therefore, the switch S1 is closed and the switch S2 is opened. For the modes of operation already described in FIG. 1, the switch S1 is opened and the switch S2 is closed.

Figure 3:
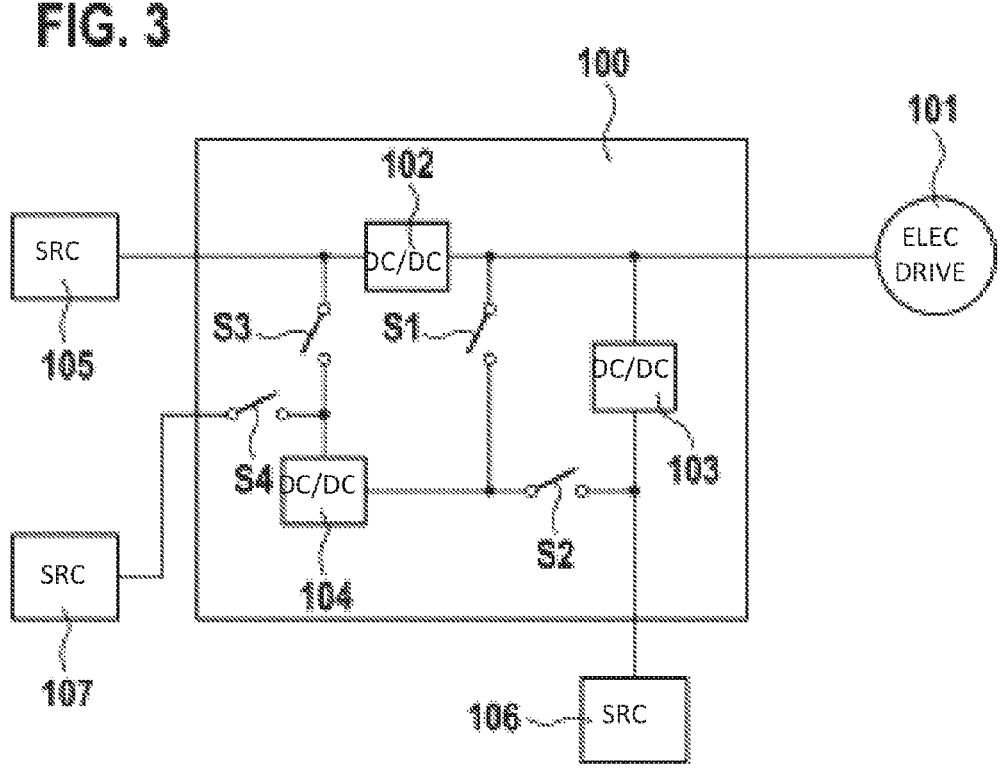
FIG. 3 shows, in schematic form, a further exemplary embodiment of the device according to the invention for supplying electric current to an electric drive.

FIG. 3 shows, in schematic form, a further exemplary embodiment of the device 100 according to the invention. A third energy source 107 is couplable to the electrical connection between the first energy source 105 and the third DC-to-DC converter 104 by means of an additionally provided fourth switching element S4. A further switching element S3 is provided. Said further switching element is arranged in such a way that the electrical connection of both the first DC-to-DC converter 102 and the first energy source 105 to the fourth switching element S4 and the third DC-to-DC converter 104 can be interrupted or closed. By closing of the third and fourth switching elements S3, S4, therefore, a direct energy transfer by the first energy source 105 to the third energy source 107 can be made possible.

The third energy source 107 can therefore be charged efficiently. This is particularly advantageous when using a capacitor or a supercapacitor as the third energy source 107. By closing of the switching element S4 on its own and depending on the switch position of S3, S1 and S2, the energy from the energy source 107 can be supplied either to the electric drive 101 or the energy sources 105, 106.

Figure 4:
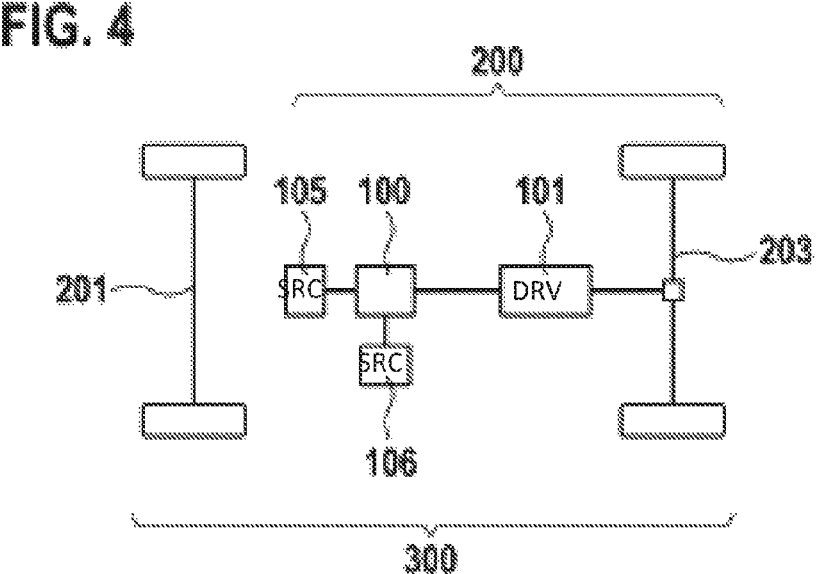
FIG. 4 shows, in schematic form, an electrically driven vehicle with a drive train according to the invention.

FIG. 4 shows, in schematic form, a drive train 200 according to the invention in an electrically driven vehicle 300. The front axle 201 with wheels of the vehicle is illustrated. The electric drive 101 drives the drive axle 203 with wheels. The electric drive 101, for example comprising an inverter and an electric machine, is supplied electrical energy from the electrical energy sources 105, 106 via a device 100 according to the invention.

Figure 5:
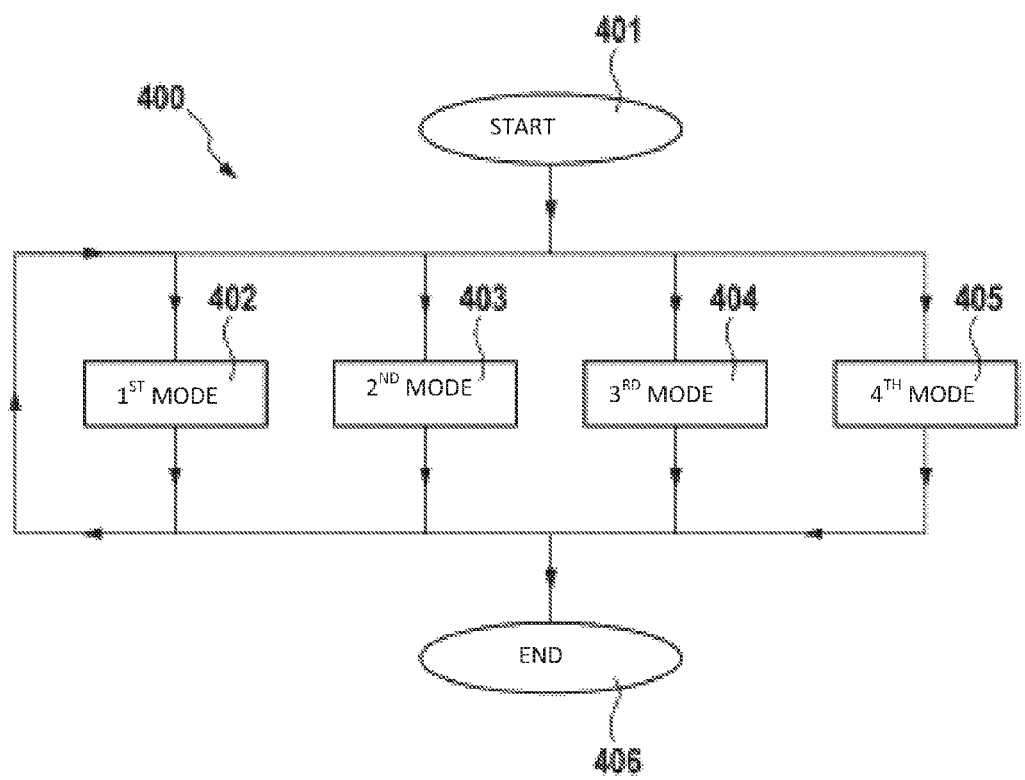
FIG. 5 shows, in schematic form, a method according to the invention for supplying electric current to an electric drive.

FIG. 5 shows a method 400 according to the invention for supplying electric current to an electric drive 101. In step 401, the method is started. Depending on which mode of operation is selected, the further steps 402, 403, 404, 405 are selected and repeated as often as necessary in any desired sequence and for any desired duration. The method is ended with step 406.

In step 402, the DC-to-DC converters are coupled and operated in a first operating mode in such a way that each individual one of the at least two electrical energy sources 105, 106 is coupled directly to the electric drive 101 via one of the individual ones of the three DC-to-DC converters 102, 103, 104. For this purpose, for example, by clocked actuation and in particular closing of the internal switches of the first DC-to-DC converter 102, the first energy source 105 is coupled to the electric drive 101 and the energy is transmitted from the first energy source 105 to the electric drive 101. This takes place in the same way with the second DC-to-DC converter 103 and the second energy source 106.

In method step 403, the DC-to-DC converters are coupled and operated in a second operating mode in such a way that the at least two electrical energy sources 105, 106 are coupled directly via one of the three DC-to-DC converters 102, 103, 104. For this purpose, for example, by clocked actuation and in particular closing of the internal switches of the third DC-to-DC converter 104, the first energy source 105 is coupled to the second electrical energy source 106 and the energy from the first energy source 105 is transmitted to the second energy source 106. At high drive powers, current can also be conducted temporarily from the first energy source to the electric drive 101 via the series circuit comprising the third DC-to-DC converter 104 and the second DC-to-DC converter 103. This path, which is not entirely optimal, is however used in particular in acceleration phases or in phases with permanently high speeds of the vehicle.

In method step 404, the DC-to-DC converters are coupled and operated in a third operating mode in such a way that a single one of the at least two electrical energy sources 105, 106 is coupled directly to the electric drive 101 via two parallel-connected DC-to-DC converters 102, 103, 104. For this purpose, for example, by means of closing the switching element S1 and opening the switching element S2 and by virtue of clocked actuation and in particular closing of the internal switches of the first and third DC-to-DC converters 102, 104, the first energy source 105 is coupled to the electric drive 101 via the first and third DC-to-DC converters 102, 104 and the energy from the first energy source 105 is transmitted to the electric drive 101.

In method step 405, in a fourth operating mode, a third electrical energy source 107 is coupled to the three DC-to-DC converters 102, 103, 104 in such a way that the third electrical energy source 107 is coupled directly to one of the at least two electrical energy sources 105, 106. For this purpose, for example by means of closing of the switching element S4 and closing of the switching element S3, the first energy source 105 is coupled directly to the third energy source 107, with the result that energy transfer takes place between the two energy sources 105 and 107.

The invention claimed is:

1. A device (100) for supplying electric current to an electric drive (101), comprising three DC-to-DC converters (102, 103, 104), coupled in a ring formation, for coupling at least two connectable electrical energy sources (105, 106) to the electric drive (101), characterized in that the DC-to-DC converters (102, 103, 104) are couplable in such a way that a direct coupling of each individual one of the at least two electrical energy sources (105, 106) to the electric drive (101) is formed via a single one of the three DC-to-DC converters (102, 103, 104); wherein the DC-to-DC converters (102, 103, 104) are couplable such that a direct coupling of the at least two electrical energy sources (105, 106) via one of the three DC-to-DC converters (102, 103, 104) is formed.

2. The device as claimed in claim 1, characterized in that the DC-to-DC converters (102, 103, 104) are couplable in such a way that a direct coupling of a single one of the at least two electrical energy sources (105, 106) to the electric drive (101) via two DC-to-DC converters (102, 103, 104) connected in parallel is formed.

3. The device as claimed in claim 1, characterized in that a third electrical energy source (107) is provided, which is couplable to the device (100) in such a way that a direct coupling of the third electrical energy source (107) to one of the at least two electrical energy sources (105, 106) is formed.

4. The device as claimed in claim 1, characterized in that the electrical energy sources (105, 106, 107) comprise a fuel cell and/or a rechargeable battery and/or a capacitor.

5. The device as claimed in claim 1, characterized in that the three DC-to-DC converters (102, 103, 104) have an identical design.

6. A drive train (200) for a vehicle (300), comprising at least two electrical energy sources (105, 106), an electric drive (101) and a device (100) for supplying electric current to the electric drive (101) as claimed in claim 1.

7. A method (400) for supplying electric current to an electric drive (101), wherein three DC-to-DC converters (102, 103, 104), coupled in a ring formation, are provided for coupling at least two connectable electrical energy sources (105, 106) to the electric drive (101), characterized in that the DC-to-DC converters (102, 103, 104) are coupled (402) in such a way that each individual one of the at least two electrical energy sources (105, 106) is coupled directly to the electric drive (101) via an individual one of the three DC-to-DC converters (102, 103, 104), and wherein the DC-to-DC converters are coupled (403) in such a way that the at least two electrical energy sources (105, 106) are coupled directly via one of the three DC-to-DC converters (102, 103, 104).

8. The method (400) as claimed in claim 7, characterized in that the DC-to-DC converters (102, 103, 104) are coupled (404) in such a way that a single one of the at least two electrical energy sources (105, 106) is coupled directly to the electric drive (101) via two DC-to-DC-converters (102, 103, 104) connected in parallel.

9. The method as claimed in claim 7, characterized in that a third electrical energy source (107) is coupled (405) to the three DC-to-DC converters (102, 103, 104) in such a way that the third electrical energy source (107) is coupled directly to one of the at least two electrical energy sources (105, 106).

10. The device as claimed in claim 1, characterized in that the electrical energy sources (105, 106, 107) comprises a fuel cell.

11. The device as claimed in claim 1, characterized in that the electrical energy sources (105, 106, 107) comprises a rechargeable battery.

12. The device as claimed in claim 1, characterized in that the electrical energy sources (105, 106, 107) comprises a capacitor.

* * * * *